US012667525B2

(12) United States Patent
Akhlaghi et al.

(10) Patent No.: US 12,667,525 B2
(45) Date of Patent: Jun. 30, 2026

(54) PACIFIER PUMP

(71) Applicant: Medernity Inc., Littleton, CO (US)

(72) Inventors: Amin Akhlaghi, Great Falls, VA (US); Kyle Addison Knuppel, Littleton, CO (US)

(73) Assignee: Medernity Inc.

( * ) Notice: Subject to any disclaimer, the term of this patent is extended or adjusted under 35 U.S.C. 154(b) by 201 days.

(21) Appl. No.: 18/623,789

(22) Filed: Apr. 1, 2024

(65) Prior Publication Data

US 2025/0302702 A1 Oct. 2, 2025

(51) Int. Cl.
*A61J 17/00* (2006.01)

(52) U.S. Cl.
CPC .................................... *A61J 17/10* (2020.05)

(58) Field of Classification Search
CPC .......... A61J 17/00; A61J 17/001; A61J 17/10; A61J 17/105; A61J 7/0053; A61J 15/0003; A61J 15/0011; A61J 15/0015; A61J 15/0076; A61J 15/0092
See application file for complete search history.

(56) References Cited

U.S. PATENT DOCUMENTS

| | | | | |
|---|---|---|---|---|
| 4,796,628 A | 1/1989 | Anderson | | |
| 6,033,367 A | 3/2000 | Goldfield | | |
| 6,482,225 B1 | 11/2002 | Bingham et al. | | |
| 6,776,157 B2 * | 8/2004 | Williams | A61B 1/24 | 128/200.26 |
| 7,545,230 B2 | 6/2009 | Jang et al. | | |
| 7,883,530 B2 | 2/2011 | Tesini et al. | | |
| 8,141,728 B1 | 3/2012 | Dahler et al. | | |
| 2002/0095118 A1 | 7/2002 | Bertoch et al. | | |
| 2008/0039778 A1 | 2/2008 | Goldie et al. | | |
| 2014/0276041 A1 * | 9/2014 | Hamet | A61M 31/005 | 600/432 |
| 2021/0220226 A1 * | 7/2021 | Filter | A61J 11/005 | |

OTHER PUBLICATIONS

Ferrara-Gonzalez, L., "Partner Spotlight: Non-Nutritive Sucking is About More Than Just Feeding," *National Association of Neonatal Therapists*, Nov. 2022.

Gennattasio, A. et al., "Oral Feeding Rediness Assessment in Premature Infants," *Wolters Kluwer Health, Inc.*, 40(2):96-104, Mar. 2015.

Widstrom, A. et al., "Nonnutritive Sucking in Tube-Fed Preterm Infants: Effects on Gastric Motility and Gastric Contents of Somatostatin," *Journal of Pediatric Gastroenterology and Nutrition*, 7: 517-523, 1988, New York, USA.

Harry Kim, International Search Report and Written Opinion of the International Searching Authority, mailed Jul. 17, 2025, PCT/US2025/021576, United States Patent and Trademark Office as the International Searching Authority, United States.

* cited by examiner

*Primary Examiner* — Todd J Scherbel
(74) *Attorney, Agent, or Firm* — Laura Marmulstein

(57) ABSTRACT

A pacifier pump system is described herein. The pacifier pump system generally includes a housing or hub defining a receiving channel and having a first valve and a second valve, wherein the housing or hub is configured to be removably coupled to an opening defined within a pacifier. A reservoir tubing may be fluidly coupled to the receiving channel through the first valve which is configured to enable flow from the reservoir tubing into the receiving channel. The system may further include a feed tubing fluid coupled to the receiving channel through the second valve which is configured to enable flow from the receiving channel into the feed tubing.

25 Claims, 7 Drawing Sheets

PACIFIER PUMP

FIELD OF THE INVENTION

The present invention relates to medical devices. In particular, the present invention relates to apparatus and methods for supporting the feeding of infants.

BACKGROUND OF THE INVENTION

Some infants, particularly preterm infants, are susceptible to a number of conditions such as neurodevelopmental immaturity, physiologic instability, and behavioral state disorganization. Because of this, challenges often arise with successfully beginning oral feedings and achieving full oral intake which in turn may delay hospital discharge and considerably increase the cost of care. Feeding problems also may account for a significant portion of early readmissions for late preterm infants whereas successful breastfeeding has been found to be protective against hospital readmission among infants born at under 33 weeks gestation.

To ensure that the infant is receiving adequate nutrition, feeding through nasogastric or orogastric tubes is often used. However, the use of tube feeding often de-couples the association between sucking and feeding in the infant. Clinical experience suggests that sucking of a pacifier, in connection with tube feeding, can facilitate feeding. Non-nutritive sucking has also been shown to enhance the rate of weight gain in preterm infants as such effects may be related to an activation of vagal nerve activity via a stimulation of fibers in the oral cavity. Vagal activation is known to induce gastric receptive relaxation and to enhance the rate of gastric acid secretion and the rate of gastric emptying.

The use of a pacifier during tube feeding appears to be favorable as neurogenic mechanisms normally induced during oral feeding are activated by sucking. Hence, vagal activation induced by sucking stimulates secretory motor and endocrine processes in connection with feeding, which can lead to an optimized digestion and metabolism of the food ingested. The presence of a pacifier in the mouth of a bolus-fed infant also provides sensory information from the oral mucosa that may be of importance for a normal development of feeding behavior.

Aside from aiding the development of feeding behavior, the use of a pacifier may also provide a number of additional benefits such as facilitating gastric emptying and reducing feeding intolerance, reducing the occurrence of gastrointestinal damage, increasing levels of gastrin and somatostatin (which aid in acid secretion, optimal digestion, absorption of nutrients, and expulsion of waste products), reducing stress, as well as supporting immediate pain regulation and reducing pain reactivity.

Accordingly, there is a need for devices and methods which are able to take advantage of the use of a pacifier while maintaining the association of the sucking reflex with feeding in the infant.

SUMMARY OF THE INVENTION

A pacifier pump system provides a self-actuated feeding mechanism for the infant which takes advantage of the sucking reflex of the infant. The pacifier pump systems also maintain or couple the association between the sucking reflex with the physiological mechanisms associated with feeding (e.g., breastfeeding).

One method of feeding an infant generally comprises fluidly coupling a housing or hub within an opening of a pacifier, fluidly coupling a reservoir tubing extending from the housing or hub to a fluid reservoir, fluidly coupling a feed tubing extending from the housing or hub to a gastric tube extending into the infant, and positioning the pacifier within a mouth of the infant, wherein a sucking motion provided by the infant upon a nipple of the pacifier actuates a fluid within the fluid reservoir to flow through the reservoir tubing, into the housing or hub, through the feed tubing, and into the gastric tube to provide the fluid to the infant.

In another aspect, the method includes fluidly coupling the housing or hub by inserting the housing or hub within the opening of the pacifier.

In another aspect, the method includes fluidly coupling the reservoir tubing by fluidly coupling through a first unidirectional valve which enables flow from the reservoir tubing into the housing or hub.

In another aspect, the method includes coupling the reservoir tubing by fluidly coupling the reservoir tube to a hub of a syringe.

In another aspect, the method includes fluidly coupling the feed tubing by fluidly coupling through a second unidirectional valve which enables flow from the housing or hub into the feed tubing.

In another aspect, the gastric tube comprises a nasogastric or orogastric tube.

In another aspect, the sucking motion provided by the infant comprises a compression and decompression of the nipple of the pacifier.

In another aspect, the method includes imparting a pressure upon the fluid.

Another method of associating feeding in an infant may generally comprise providing a pacifier positioned within a mouth of the infant, wherein the pacifier is fluidly coupled to a fluid reservoir and also to a gastric tube extending into the infant, providing a fluid within the fluid reservoir, wherein the fluid is actuated to flow from the fluid reservoir, through the pacifier, and to the gastric tube when the infant sucks upon the pacifier.

In another aspect, the method includes providing the pacifier by inserting a housing or hub within an opening of a pacifier.

In another aspect, the method includes fluidly coupling the pacifier to the fluid reservoir through a reservoir tubing.

In another aspect, the method includes fluidly coupling the reservoir tubing through a first unidirectional valve which enables flow from the reservoir tubing into the housing or hub.

In another aspect, the method includes fluidly coupling the reservoir tubing to a hub of a syringe.

In another aspect, the method includes fluidly coupling the pacifier to the gastric tube through a feed tubing.

In another aspect, the method includes fluidly coupling the feed tubing to the housing or hub through a second unidirectional valve which enables flow from the housing or hub into the feed tubing.

In another aspect, the gastric tube comprises a nasogastric or orogastric tube.

In another aspect, the sucking motion provided by the infant comprises a compression and decompression of a nipple of the pacifier.

In another aspect, the method includes imparting a pressure upon the fluid as the infant sucks upon the pacifier.

One variation of the pacifier pump system may generally comprise a housing or hub defining a receiving channel and having a first valve and a second valve, wherein the housing or hub is configured to be removably coupled to an opening defined within a pacifier, a reservoir tubing fluidly coupled to the receiving channel through the first valve which is configured to enable flow from the reservoir tubing into the receiving channel, and a feed tubing fluid coupled to the receiving channel through the second valve which is configured to enable flow from the receiving channel into the feed tubing.

In another aspect, the housing or hub forms an enclosure between the receiving channel and the opening defined within the pacifier.

In another aspect, the system includes a fluid reservoir which is removably attachable to the reservoir tubing.

In another aspect, the system includes a gastric tube which is removably attachable to the feed tubing.

In another aspect, the first valve comprises a unidirectional valve which enables unidirectional flow from the reservoir tubing into the receiving channel.

In another aspect, the second valve comprises a unidirectional valve which enables unidirectional flow from the receiving channel into the feed tubing.

In another aspect, the system includes a mechanism for imparting a pressure upon a fluid within the pacifier.

DETAILED DESCRIPTION OF THE INVENTION

A pacifier pump system may be used to maintain or couple the association between the sucking reflex in an infant with the physiological mechanisms associated with feeding (e.g., breastfeeding). Additionally, the use of a pacifier pump system by the infant may also directly provide a self-actuated feeding mechanism for the infant rather than requiring a multi-step process of providing a pacifier to an infant and separately feeding the infant through a separate tubing mechanism. As used herein, the term "infant" has its plain and ordinary meaning in the medical field, specifically, a child in the first year of life (i.e., from birth up to 12 months of age).

Figure 1:
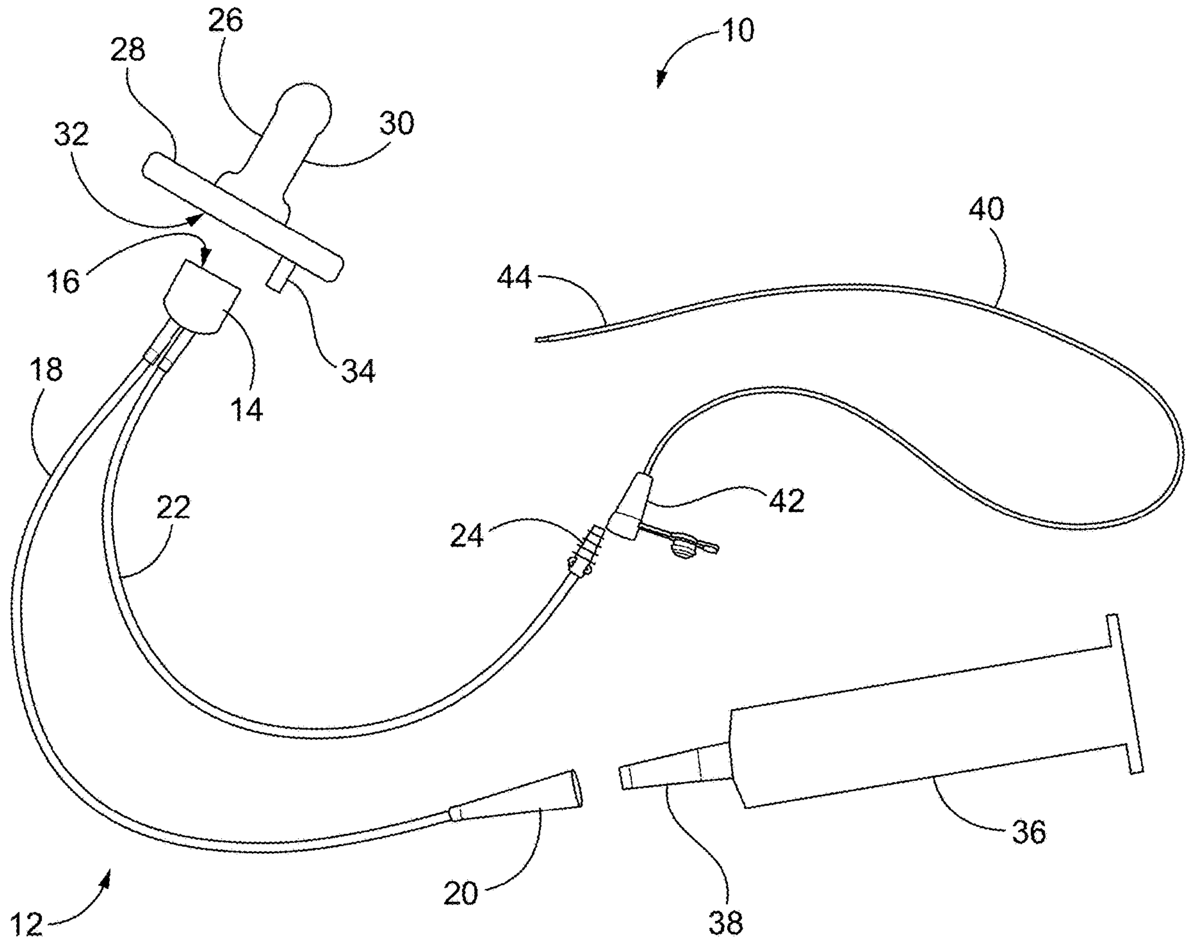
FIG. 1 shows a perspective assembly view of one variation of the pacifier pump system.

FIG. 1 shows a perspective assembly view of one variation of the pacifier pump system 10 which may include a fluid transfer assembly 12, a fluid reservoir 36, gastric tubing 40, and a pacifier 26. The fluid transfer assembly 12 may be generally comprised of a flexible fluid transfer housing or hub 14, reservoir tubing 18, and feeding tubing 22. The fluid transfer housing 14 may be sized and shaped to fit within a nipple cavity of a pacifier. The fluid transfer housing 14 may define a receiving channel or cavity 16. The fluid transfer housing 14 defines an opening at one end of the receiving channel 16. In some embodiments, the receiving channel 16 may be enclosed or partially enclosed (see, e.g., FIG. 4B, which shows an embodiment where the fluid transfer housing 14 includes a flexible membrane or diaphragm 62 which encapsulates the receiving channel 16). The reservoir tubing 18 may comprise a reservoir tubing 18 first end and a reservoir tubing 18 second end, with a length of the reservoir tubing 18 defined between the reservoir tubing 18 first and second ends. The reservoir tubing 18 first end may be fluidly coupled to the fluid transfer housing 14 and the reservoir tubing 18 second end may define a reservoir connector 20. The fluid reservoir 36, e.g., syringe, bag, pouch, or any fluid container, may comprise a fluid reservoir hub 38. The reservoir connector 20 may be removably connectable to the fluid reservoir hub 38, or in other variations, the reservoir connector 20 may be removably or permanently fluidly coupled directly to the fluid reservoir 36. The reservoir connector 20 may be sized and shaped to correspond to the size and shape of the fluid reservoir hub 38. The fluid reservoir 36 may include any fluid container which is suitable for storing a fluid (e.g., formula, breastmilk, saline, etc.), which is provided to the infant through the fluid transfer assembly 12.

The feed tubing 22 may comprise a feed tubing 22 first end and feed tubing 22 second end, with a length of the feed tubing 22 defined between the feed tubing 22 first and second ends. The feed tubing 22 first end may be fluidly coupled to the fluid transfer housing 14 at a position adjacent to the reservoir tubing 18 first end. The feed tubing 22 may extend from the fluid transfer housing 14. The reservoir tubing 18 and the feed tubing 22 may be coupled directly to the fluid transfer housing 14 (e.g., as shown in FIGS. 4A-5C) or via intermediary members (e.g., as shown in FIG. 1). The feed tubing 22 second end may comprise a feed connector 24. The gastric tubing 40 (e.g., nasogastric, orogastric, endoscopic gastrostomy, etc.) may comprise a first or proximal gastric tubing 40 end and a distal end 44, with a length of the gastric tubing 40 defined between the first or proximal gastric tubing 40 end and the distal end 44. The first or proximal gastric tubing 40 end may define a gastric tubing port 42 and the distal end 44 may define one or more openings. The feed connector 24 of the feed tubing 22 may removably couple to the gastric tubing port 42. As shown, the feed connector 24 may include threading to couple to the gastric tubing port 42. The tubing components of the pacifier pump system 10—which may include the gastric tubing 40, the feed tubing 22, and the reservoir tubing 18—may vary in sizing. For example, the gastric tubing 40 may range in length and diameter depending upon the type of tubing. The length of the feed tubing 22 and length of the reservoir tubing 18 may be varied to be uniform with one another or to have differing lengths relative to one another. The length of the reservoir tubing 18 may extend anywhere between, e.g., 2 to 60 cm, while the length of the feed tubing 22 may extend anywhere between, e.g., 10 to 30 cm. Moreover, the internal diameters of the reservoir tubing 18 and feed tubing 22 may also be the same as one another or varied to be different relative to one another and may range anywhere between, e.g., 1 to 5 mm, to accommodate the desired flow rate and flow volume through the fluid transfer assembly 12.

As shown in the figures, the pacifier 26 may include a base or guard 28 and a nipple 30 structure extending from a first side of the base or guard 28 for insertion within a human mouth, specifically the infant's mouth. The nipple 30 may define a nipple cavity 33 that is accessible by a guard opening 32 defined in a second side of the base or guard 28. The nipple 30 may be sufficiently compressible. An optional projection 34 may also extend from the base or guard 28 for facilitating handling or attachment of various features. The pacifier 26 may be a type which is specifically configured or designed for coupling to the fluid transfer housing 14 while in other variations, the pacifier 26 may include a conventional flexible pacifier such as one fabricated from silicone. One example may include the AVENT SOOTHIE Pacifier (Koninklijke Philips N. V.), which is commonly used as a pacifier for newborn infants. Other conventional pacifiers may also be used provided that the nipple is sufficiently flexible and allows for the insertion or coupling of the housing 14.

The fluid transfer housing 14 may be coupled to or inserted into the pacifier 26. For example, the fluid transfer housing 14 may be inserted into the guard opening 32 and coupled to the guard 28. The fluid transfer housing 14 may be positioned at least partially within the nipple cavity 33. As shown in FIGS. 3B-5C, the fluid transfer housing 14 may be sized and shaped to correspond to a size and shape of the guard opening 32 and nipple cavity 33. As shown, the fluid transfer housing 14 is positioned inside the guard opening 32 and nipple cavity 33 and may be coupled to the pacifier 26 (e.g., to the guard 28) by a fluid-tight fit. The receiving channel 16 may be open to the interior of the pacifier 26. Specifically, the receiving channel 16 may be open to the nipple cavity 33. The receiving channel 16 and nipple cavity 33 may form a single cavity within the pacifier 26. In other variations (described herein), the receiving channel 16 may be enclosed or partially enclosed within the pacifier 26.

While the fluid transfer assembly 12 is shown and described in one variation as a separate or separable component from the pacifier 26, fluid reservoir 36, and gastric tubing 40, other variations of the pacifier pump system 10 may include a fluid transfer assembly 12 which is integrated with one or more of the other components. For example, the fluid transfer assembly 12 may be integrated with the pacifier 26 so that the gastric tubing 40 and fluid reservoir 36 may be separably attachable. Other variations may include the fluid transfer assembly 12 integrated with the gastric tube 40 so that the pacifier 26 and fluid reservoir 36 are separably attachable. While other variations may include the fluid transfer assembly 12 integrated with the fluid reservoir 36 so that the pacifier 26 and gastric tube 40 are separably attachable. Other variations of the fluid transfer assembly 12 are also intended to be included in any combination as practicable.

Figure 2:
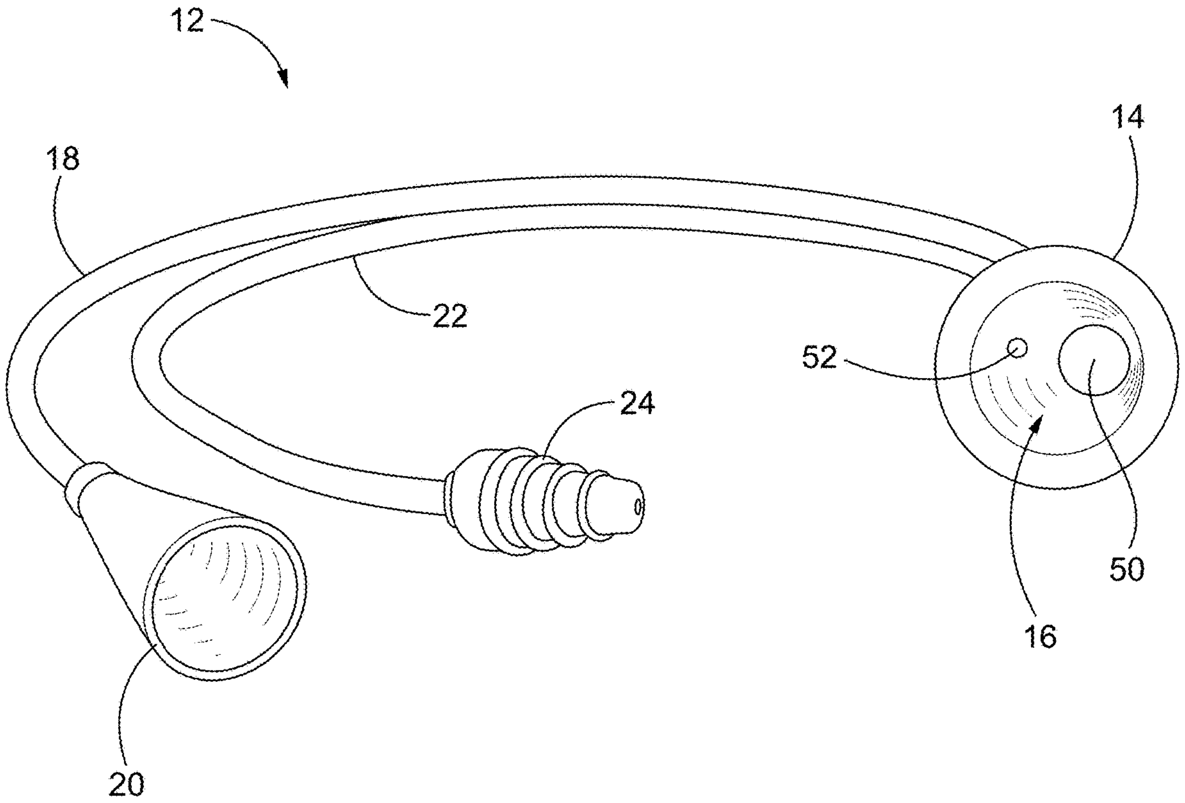
FIG. 2 shows a perspective view of one variation of the fluid transfer assembly.

FIG. 2 shows a detail view of one variation of the fluid transfer assembly 12. The fluid transfer housing 14 may include one or more valves. As illustrated, the fluid transfer housing 14 includes a first valve 50 (e.g., directional valve, check valve, etc.) and a second valve 52 (e.g., directional valve, check valve, etc.). As shown, the first valve 50 and the second valve 52 may be positioned inside the receiving channel 16. The first end of the reservoir tubing 18 may be coupled to the fluid transfer housing 14 such that the reservoir tubing 18 is fluidly coupled to the first valve 50. The first valve 50 may be positioned between a reservoir tubing 18 channel or lumen defined by the reservoir tubing 18 and the receiving channel 16 of the fluid transfer housing 14 to regulate the flow of fluids between the reservoir tubing 18 and the fluid transfer housing 14. As discussed above with respect to the fluid transfer assembly 12 of FIG. 1, the second end of the reservoir tubing 18 may comprise the reservoir connector 20 for fluidly coupling to the fluid reservoir 36. The first end of the feed tubing 22 may be coupled to the fluid transfer housing 14 such that the feed tubing 22 is fluidly coupled to the second valve 52. The second valve 52 may be positioned between a feed tubing 22 channel or lumen defined by the feed tubing 22 and the receiving channel 16 of the fluid transfer housing 14 to regulate the flow of fluids between the fluid transfer housing 14 and the feed tubing 22. As discussed above with respect to the fluid transfer assembly 12 of FIG. 2, the second end of the feed tubing 22 may comprise the feed connector 24 for fluid coupling to the gastric tube 40. In some embodiments (e.g., FIG. 2), the first valve 50 and the second valve 52 are different sizes; however, it is contemplated that the first valve 50 and the second valve 52 may be the same size (e.g., as shown in FIGS. 4A-5C).

The first valve 50 may be configured to allow for the directional flow of fluid from the fluid reservoir 36, through the reservoir tubing 18 lumen, through the first valve 50, and into the interior or receiving channel 16 of the fluid transfer housing 14. The second valve 52 may be configured to allow for the directional flow of the fluid received within the fluid transfer housing 14 through the second valve 52 and into the feed tubing 22 lumen where the fluid may be urged through the feed connector 24 and into the gastric tube 40 for feeding into the stomach of a human. The configuration of the first valve 50 and second valve 52 prevents the backflow of the fluid through the fluid transfer housing 14 (e.g., in a direction from the feed tubing 22 toward the reservoir tubing 18) and further ensures that adequate backpressure is built up through use by the infant, as described in further detail herein.

Figure 3A:
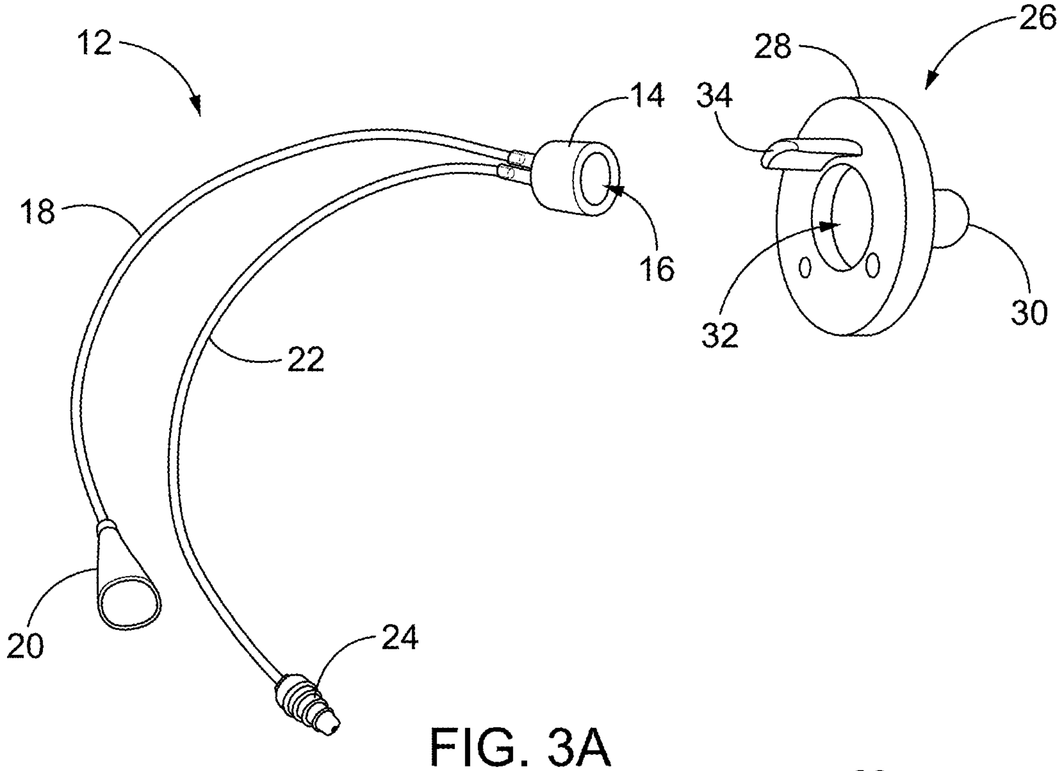
FIGS. 3A and 3B show perspective views of the fluid transfer assembly removably inserted into a pacifier.
Figure 3B:
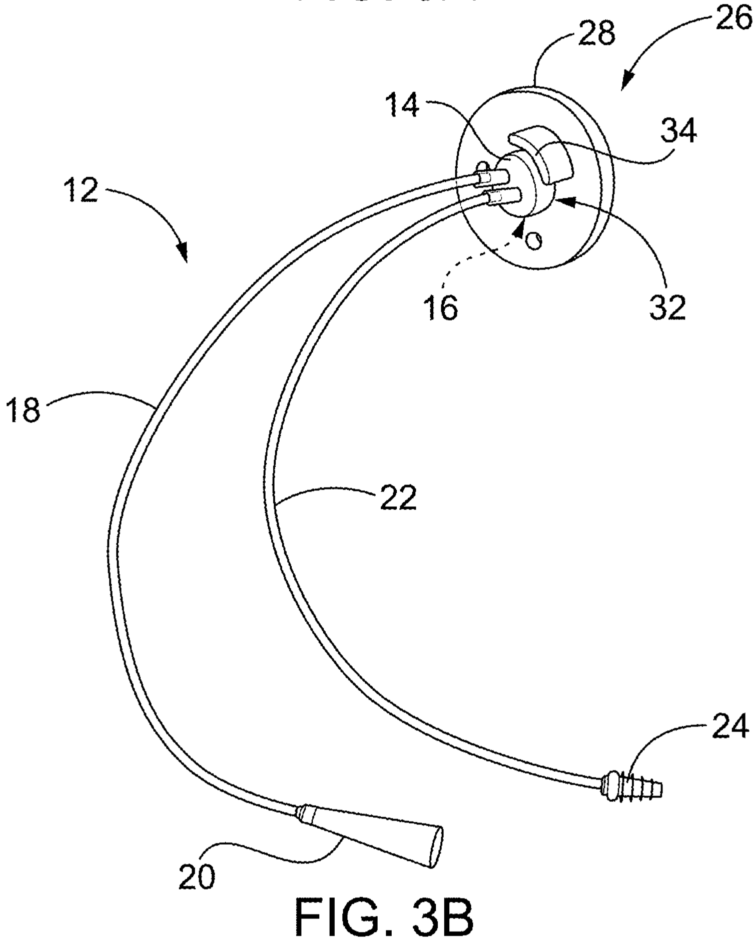

FIGS. 3A and 3B show perspective views of one variation in which the fluid transfer assembly 12 is removably coupled with the pacifier 26. The fluid transfer housing 14, and the open receiving channel 16 defined therein, may be inserted into the guard opening 32 defined by the pacifier 26 and may extend into the interior of the nipple 30, also referred to herein as the nipple cavity 33. The fluid transfer housing 14 may have a diameter of between, e.g., 1.5 to 2.5 cm, so that the fluid transfer housing 14 may be inserted in a secure fluid-tight attachment or fit within the guard opening 32 of the pacifier 26. As shown in FIG. 3B, once the fluid transfer housing 14 has been inserted securely within the guard opening 32 and nipple cavity 33, the receiving channel 16 and nipple cavity 33 may form a fluid chamber for receiving and transferring fluids within. The fluid transfer housing 14 may have a flexible structure (see, e.g., FIGS. 5A-C), which allows for movement (e.g., compression) of the fluid transfer housing 14 upon movement (e.g., compression) of the nipple 30.

Figure 4A:
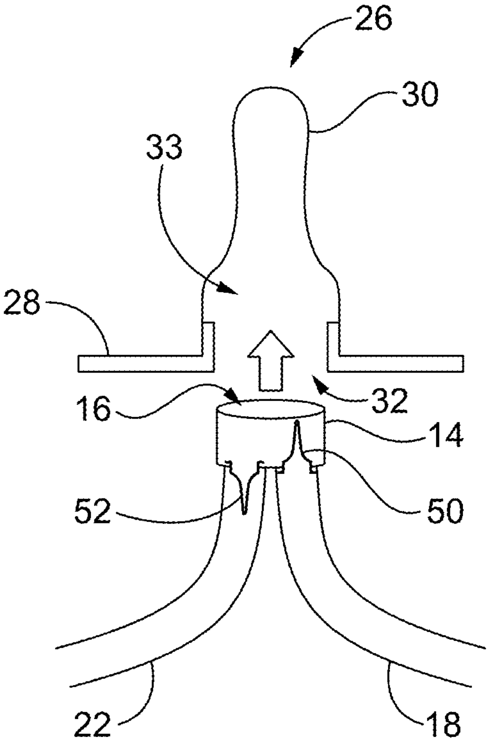
FIG. 4A shows a schematic side view of one variation for fluidly coupling the fluid transfer assembly to the pacifier.

FIG. 4A illustrates a schematic side view of the variation shown in FIGS. 3A and 3B. As shown, the fluid transfer housing 14 may be inserted into a secure engagement or fluid-tight fit with the pacifier 26 in which the outer surface of the fluid transfer housing 14 may inter-fit against or fit with a fluid-tight connection with the inner surface of the guard opening 32. The resulting combination of the receiving channel 16 and nipple cavity 33 may form a fluid-tight chamber into which the first valve 50 and second valve 52 may regulate the introduction and removal of fluid via the respective reservoir tubing 18 and feed tubing 22.

Figure 4B:
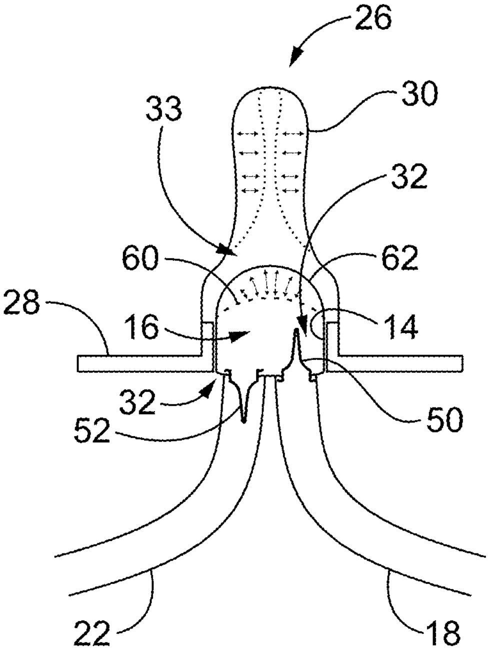
FIG. 4B shows a schematic side view of another variation of the fluid transfer assembly incorporating an expandable channel within the pacifier.

FIG. 4B illustrates yet another variation in the schematic side view in which the fluid transfer housing 14 may be securely retained within or coupled to the base or guard 28 and may further include a flexible membrane or diaphragm 62 which encapsulates receiving channel 16, such that the receiving channel 16 has a relative smaller volume than that of the nipple cavity 33. As the structure of the nipple 30 compresses and expands (e.g., due to the sucking action of an infant), the compression and expansion of the air trapped within the nipple cavity 33 may force the membrane or diaphragm 62 to expand from its resting state 60 thereby creating a negative pressure within the receiving channel 16 to draw in and force out the fluid. However, due to the relatively smaller volume defined by the receiving channel 16 and membrane or diaphragm 62, a smaller pressure differential may be needed to pump the fluid through the assembly thereby reducing the amount of pressure needed by the sucking actuation.

Figure 4C:
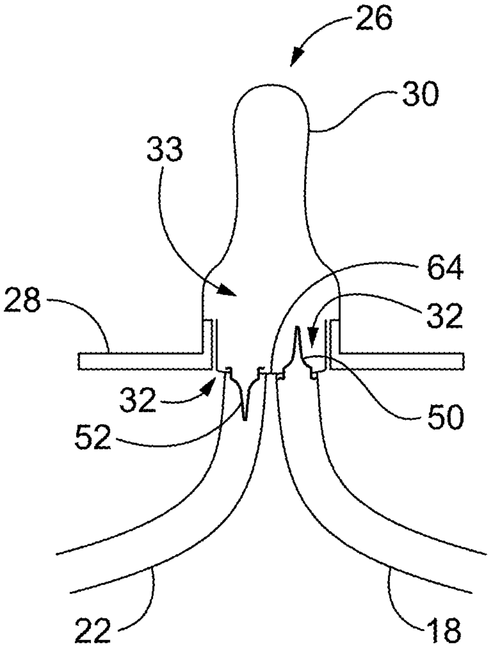
FIG. 4C shows a schematic side view of another variation of the fluid transfer assembly in which the fluid tubing and valves are incorporated directly with the pacifier.

FIG. 4C illustrates yet another variation in the schematic side view in which the base or guard 28 of the pacifier 26 may be configured to provide an integrated base 64. In this variation, the fluid transfer housing 14 may be omitted and the first valve 50 and second valve 52 may be formed directly into the base 64 which is integrated directly with the pacifier 26. The respective reservoir tubing 18 and feed tubing 22 may also be formed directly with the base 64 or they may be attached or secured directly to the base 64 rather than a separately removable fluid transfer housing or hub.

During use, the pumping action upon the fluid may be functionally provided directly by compression and expansion of the nipple 30 of the pacifier 26 (e.g., caused by a sucking motion of an infant upon the nipple 30). For example, the pacifier 26 may be provided to the infant just prior to feeding so that the infant may begin sucking upon the nipple 30 or the pacifier 26 may be provided several minutes prior to feeding. The fluid transfer housing 14 may be coupled to the pacifier prior to the infant sucking upon the pacifier 26 or the fluid transfer housing 14 may be coupled just prior to feeding while the infant retains the pacifier 26. The gastric tube 40 may be inserted intra-orally or intra-nasally (or percutaneously) prior to the feeding of the infant in a separate procedure. In either case, the feed tubing 22 may be pre-coupled to the gastric tube 40 or the feed tubing 22 may be coupled to the gastric tube 40 just prior to feeding of the infant.

Figure 5A:
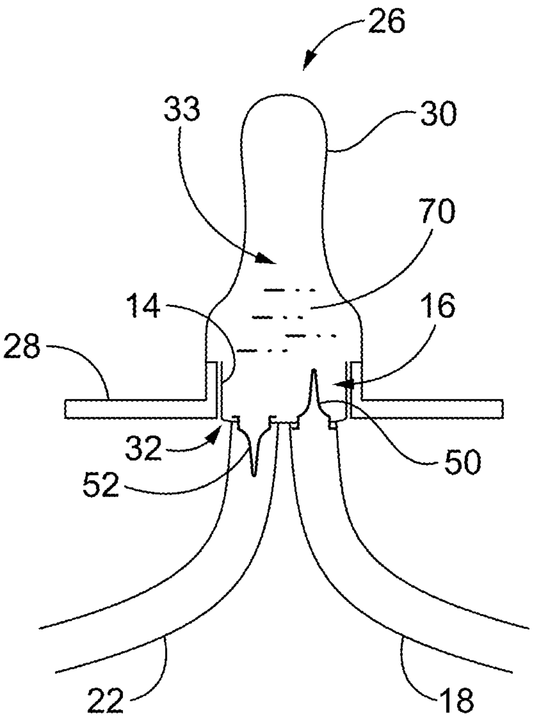
FIGS. 5A to 5C show one variation of how the pacifier may function as a pumping mechanism for moving fluid through the tubing.
Figure 5B:
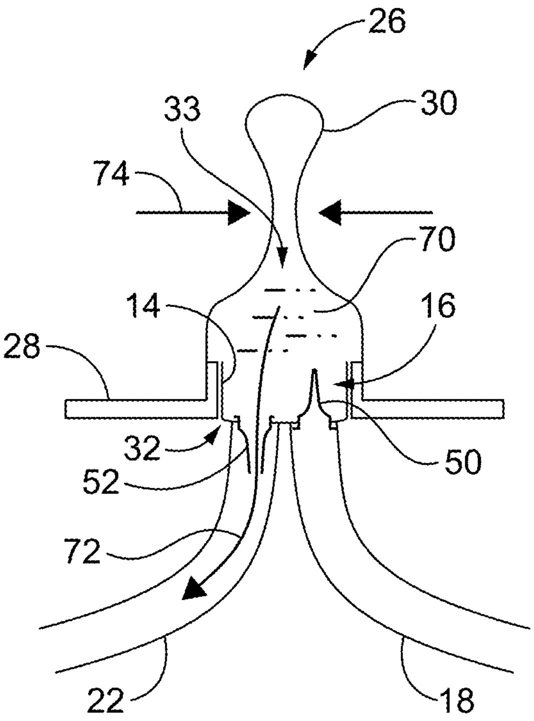

A first bolus of fluid 70 may be introduced from the fluid reservoir 36, through the reservoir tubing 18 and first valve 50, and into the nipple cavity 33 within the pacifier 26, as shown in the schematic side view of FIG. 5A. The first bolus 70 may be introduced by forcing the fluid from the fluid reservoir 36 (e.g., via a plunger, compression, etc.) or the first bolus 70 may be introduced within the pacifier 26 by compression and expansion of the nipple 30 (e.g., due to a sucking action by an infant). The first bolus 70 may pass through the first valve 50 and may be prevented from flowing backwards into the reservoir tubing 18 by the valve 50. As the infant begins or continues to suck upon the nipple 30, the nipple structure may deform and compress during its manipulation by the mouth of the infant during sucking. FIG. 5B shows a schematic side view in which the compression 74 of the nipple 30 (e.g., by the infant's mouth) may force the first bolus 70 contained within the nipple cavity 33 in an outward flow 72 from the nipple cavity 33 and through the second valve 52 and through the feed tubing 22. Backwards flow of the fluid back through the reservoir tubing 18 may be prevented by the first valve 50 closing. The bolus 70 may empty from the nipple cavity 33 and flow through the feed tubing 22 and into the gastric tube 40 for directly feeding the infant.

Figure 5C:
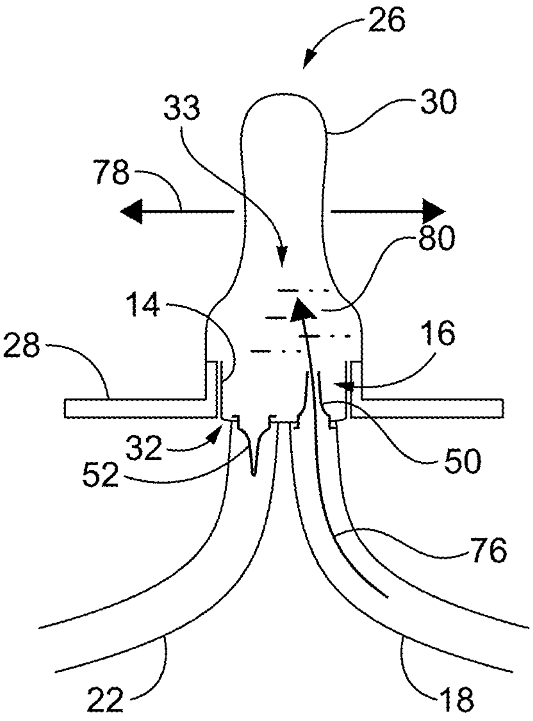

As shown in FIG. 5C, as the nipple 30 re-expands or re-forms into its original shape, as indicated by the direction of expansion 78, a negative pressure may form within the nipple cavity 33 and the second valve 52 may then close and the first valve 50 may then re-open to allow for an inflow 76 of fluid within the nipple cavity 33 from the fluid reservoir 36 such that a second bolus 80 may then be retained within the nipple cavity 33. Continued compression and expansion of the nipple 30 (e.g., via a sucking motion by the infant) may repeat the process to functionally pump the fluid into and out of the nipple cavity 33 and pacifier 26 for feeding the infant (so long as the infant continues to suck). Once the infant has been satiated and ceases to suck upon the nipple 30, the pumping of the fluid may likewise cease. Alternatively, the pumping of the fluid may be stopped manually by the caretaker.

Figure 6:
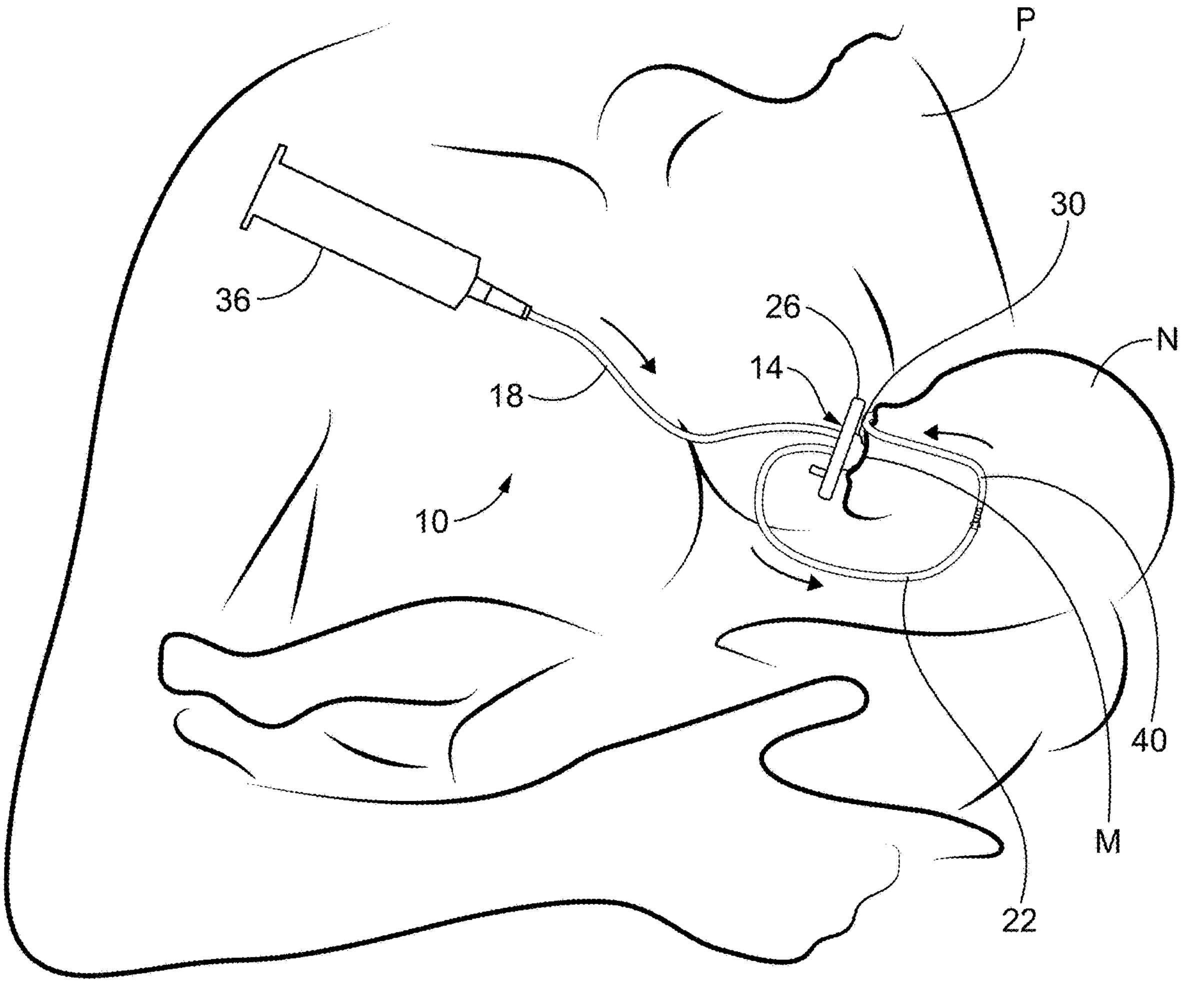
FIG. 6 shows one example of how the pacifier pump system may be utilized for feeding an infant.

FIG. 6 illustrates one example of how the pacifier pump system 10 may be utilized for feeding an infant N. In this example, the infant N may be held by a parent or caretaker P as if feeding the infant N normally. The fluid transfer housing 14 of the fluid transfer assembly 12 may be fluidly coupled to the pacifier 26 and the reservoir tubing 18 may be attached to the fluid reservoir 36 which may be held separately, placed upon the parent or caretaker P, hung upon a hook or other structure, or otherwise positioned into proximity of the infant N. The gastric tube 40 may be inserted into the infant N prior to feeding and otherwise secured to the infant N such as with an adhesive tape or other mechanism. In the example depicted, the gastric tube 40 is positioned inside the infant N's nose. The gastric tube 40 may be fluidly coupled to the feed tubing 22 with the nipple 30 of the pacifier 26 retained within the mouth M of the infant N. As shown, the gastric tube 40 may be coupled to the feed tubing 22 in a position outside the infant N, e.g., in a position that is accessible from outside the infant N's mouth and nose.

As the infant N begins or continues to suck upon the nipple 30, the fluid within the fluid reservoir 36 may be drawn through the reservoir tubing 18 by the pumping action of the pacifier 26 as provided by the sucking motion of the infant N, as described herein. The bolus of fluid may pass through the pacifier 26 and into the feed tubing 22 where it may then pass through the gastric tube 40 and into the infant N for feeding. Once the infant N has stopped sucking, the pumping action of the pacifier 26 may likewise cease to halt feeding of the infant N. The feed tubing 22 may be optionally de-coupled from the gastric tube 40 and the pacifier 26 removed from the mouth M of the infant N. The fluid reservoir 36 may also be removed and optionally de-coupled from the reservoir tubing 18. The fluid transfer housing 14 may also be optionally removed from the pacifier 26 for disposal or sterilization.

As described above, the system may be primed by forcing the fluid from the fluid reservoir 36 by using, e.g., a plunger, compression, etc., in order to introduce a first bolus 70 of fluid within the pacifier 26 by reducing the initial pressure differential that the infant must overcome by sucking upon the nipple 30. In such an embodiment, the fluid reservoir 36 may utilize a plunger to impart the pressure increase upon the fluid to force the fluid initially through the reservoir tubing 18 and/or feed tubing 22. The plunger may be depressed and maintained in place such that the increased pressure level remains constant. As the infant sucks upon the fluid, the reduction of pressure within the system may be increased again by further depressing upon the plunger.

Figure 7:
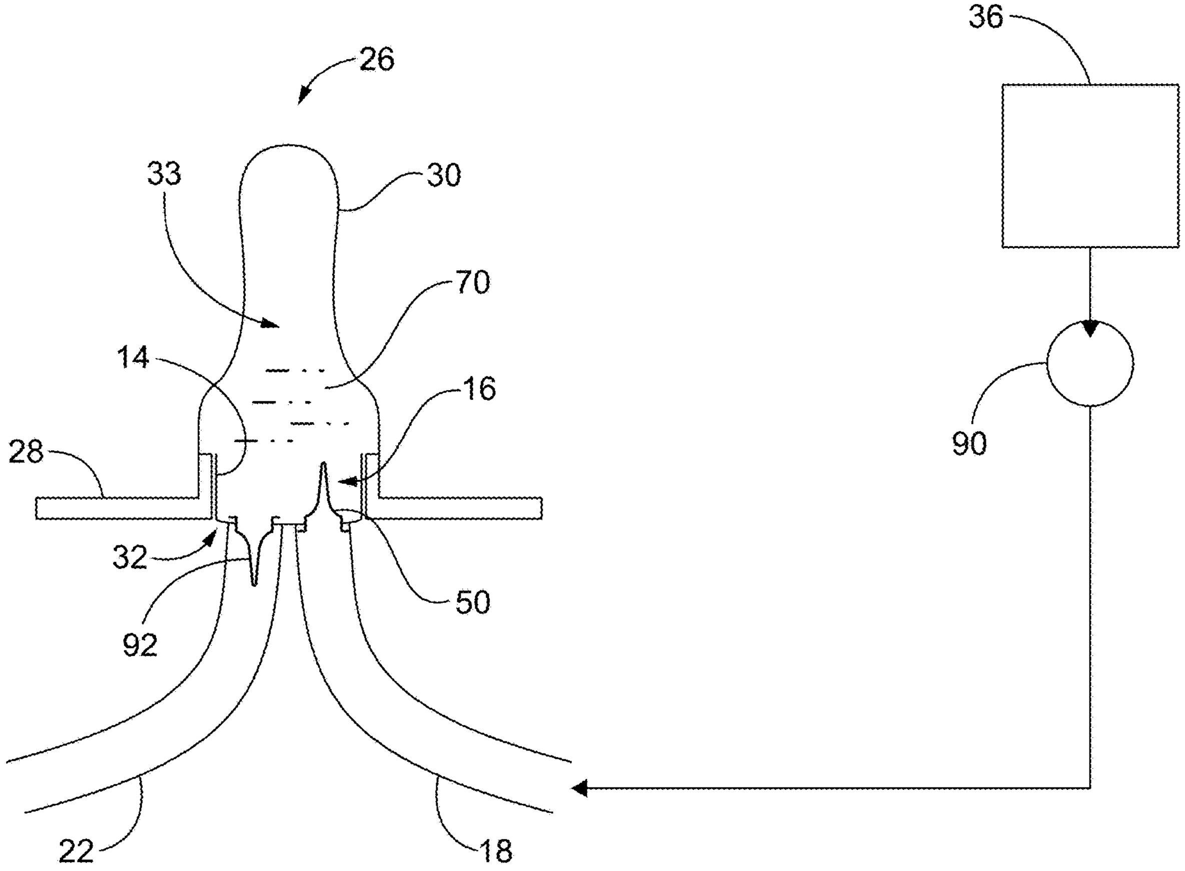
FIG. 7 shows a schematic view of yet another variation in which the fluid transfer assembly may incorporate a plunger or pumping mechanism.

Another variation may include the integration of an adjustable pressure component 90 in fluid communication with the fluid reservoir 36, as shown in schematic view of FIG. 7. The adjustable pressure component 90 may include any variety of pump such as peristaltic pump which may be used to maintain an increased pressure level upon the fluid. Furthermore, the adjustable pressure component 90 may be placed anywhere along the reservoir tube 18 or it may be integrated directly with the fluid reservoir 36 itself.

In either variation with the use of a plunger or a pump, the infant may suck upon the nipple 30 to further increase the pressure level within the nipple 30 such that the second valve 92 may open to release the bolus of fluid within. The second valve 92 may accordingly be configured to have a relatively greater opening pressure to accommodate the pressure increase from the plunger or pump in addition to the pressure generated by the infant sucking upon the nipple 30. Despite the implementation of an increased pressure upon the fluid itself, the use of the second valve 92 may meter the fluid release into the feed tubing 22 such that the infant does not experience the pressure rise directly during feeding.

We claim:

1. A method of tube feeding a human, comprising:
   coupling a housing of a fluid transfer assembly to a first side of a guard of a pacifier, wherein:
      the housing defines a receiving channel,
      the guard defines an opening on the first side of the guard,
      the receiving channel is in fluid communication with the opening;
      the opening provides access to a nipple cavity defined by a nipple that extends outwardly from a second side of the guard;
   coupling a reservoir tubing of the fluid transfer assembly to a fluid reservoir, wherein the reservoir tubing extends from the housing;
   coupling a feed tubing of the fluid transfer assembly to one end of a gastric tube, wherein a second end of the gastric tube extends inside the human, wherein the feed tubing extends from the housing; and
   positioning the pacifier within a mouth of the human,
   wherein the nipple is flexible, and
   wherein when a suction force is applied to and removed from the nipple, the nipple is configured to actuate fluid flow from the fluid reservoir, then through the reservoir tubing, then into the receiving channel, then through the feed tubing, then into the gastric tube such that the fluid can flow into the human.

2. The method of claim 1, wherein coupling the housing to the first side of the guard comprises inserting the housing within the opening, forming a fluid-tight fit between the housing and the guard.

3. The method of claim 1, wherein the reservoir tubing defines a reservoir tubing channel, and wherein the fluid transfer assembly further comprises a first unidirectional valve positioned between the reservoir tubing channel and the receiving channel, wherein the first unidirectional valve regulates a direction of fluid flow from the reservoir tubing channel into the receiving channel.

4. The method of claim 1, wherein coupling the reservoir tubing to the fluid reservoir comprises coupling the reservoir tubing to a hub of a syringe.

5. The method of claim 1, wherein the feed tubing defines a feed tubing channel, and wherein the fluid transfer assembly further comprises a second unidirectional valve positioned between the feed tubing channel and the receiving channel, wherein the second unidirectional valve regulates a direction of fluid flow from the receiving channel into the feed tubing channel.

6. The method of claim 1, wherein the gastric tube comprises a nasogastric or orogastric tube.

7. The method of claim 1, wherein repeated application and removal of the suction force on the nipple results in a repeated compression and decompression of the nipple that results in fluid flow from the fluid reservoir into the human.

8. A pacifier pump system, comprising:
   a housing defining a receiving channel, wherein the housing comprises a first valve and a second valve, and wherein the housing is sized and shaped to fit within a nipple cavity of a pacifier;
   a reservoir tubing coupled to the housing and fluidly coupled to the receiving channel through the first valve, wherein the first valve is configured to enable flow from the reservoir tubing into the receiving channel; and
   a feed tubing coupled to the housing and fluidly coupled to the receiving channel through the second valve, wherein the second valve is configured to enable fluid flow from the receiving channel into the feed tubing.

9. The system of claim 8, wherein a single cavity is formed between the receiving channel and the nipple cavity when the housing is positioned inside the nipple cavity.

10. The system of claim 9, further comprising a mechanism for imparting a pressure upon a fluid stored within the single cavity.

11. The system of claim 8, further comprising a fluid reservoir that is removably attachable to the reservoir tubing.

12. The system of claim 8, further comprising a gastric tube that is removably attachable to the feed tubing, wherein the feed tubing is configured to couple to the gastric tube in a position that is accessible from outside an infant's mouth and nose.

13. The system of claim 1, wherein the first valve comprises a unidirectional valve that enables unidirectional flow from the reservoir tubing into the receiving channel.

14. The system of claim 8, wherein the second valve comprises a unidirectional valve that enables unidirectional flow from the receiving channel into the feed tubing.

15. The system of claim 8, further comprising the pacifier, wherein the pacifier comprises a guard comprising a first side and a second side, wherein a nipple extends from the first side of the guard and defines the nipple cavity, and wherein an opening is defined on the second side of the guard, wherein the opening provides access to the nipple cavity;
   wherein the housing is coupled to the second side of the guard such that the receiving channel is in fluid communication with the opening and the nipple cavity.

16. The system of claim 15, wherein the housing is positioned at least partially inside the opening.

17. The system of claim 15, wherein the nipple is configured to actuate the flow of fluid in a direction from the reservoir tubing, then through the first valve, then through the receiving channel, then through the second valve, and then to the feed tubing when the nipple is compressed and decompressed.

18. The system of claim 8, wherein the feed tubing comprises a feed connector at a distal end of the feed tubing, wherein the feed connector is configured to couple to a gastric tube that is positioned at least partially inside of a human body.

19. A pacifier pump system, comprising:
   a pacifier comprising:
      a guard comprising a first side and a second side, and
      a nipple coupled to the first side of the guard,
      wherein the nipple is flexible and defines a nipple cavity, and wherein the second side of the guard defines an opening to the nipple cavity;

a reservoir tubing in fluid communication with the nipple cavity, the reservoir tubing configured to couple to a fluid reservoir; and a feed tubing in fluid communication with the nipple cavity, the feed tubing configured to couple to a gastric tube, wherein a first portion of the gastric tube is configured to be positioned inside an infant and a second portion of the gastric tube is configured to be positioned outside the infant, wherein the feed tubing is configured to couple to the second portion of the gastric tube;

wherein compression and decompression of the nipple actuates fluid flow from the fluid reservoir to the gastric tube when the reservoir tubing is coupled to the fluid reservoir and the feed tubing is coupled to the gastric tube.

20. The pacifier pump system of claim 19, further comprising a housing positioned inside the opening and coupled to the guard by a fluid-tight fit, wherein:

the housing is coupled to the reservoir tubing and the feed tubing, the housing defines a receiving channel, and the receiving channel is in fluid communication with the reservoir tubing, the feed tubing, and the nipple cavity.

21. The pacifier pump system of claim 19, further comprising a housing defining a receiving channel, wherein:

the housing defines a receiving channel opening at one end of the receiving channel;

a wall of the housing is positioned opposite to the receiving channel opening;

the housing is positioned at least partially within the nipple cavity;

the reservoir tubing is coupled to the wall of the housing; and the feed tubing is coupled to the wall of the housing adjacent to the reservoir tubing.

22. The pacifier pump system of claim 21, wherein the reservoir tubing defines a reservoir tubing channel, and the feed tubing defines a feed tubing channel, and wherein the pacifier pump system further comprises:

a first valve positioned between the reservoir tubing channel and the receiving channel, wherein the first valve is configured to enable flow from the reservoir tubing channel into the receiving channel; and a second valve positioned between the feed tubing channel and the receiving channel, wherein the second valve is configured to enable flow from the receiving channel into the feed tubing channel.

23. The pacifier pump system of claim 22, further comprising the gastric tube and the fluid reservoir, wherein the feed tubing is coupled to the second portion of the gastric tube and the fluid reservoir is coupled to the reservoir tubing, wherein compression and decompression of the nipple actuates the flow of fluid in a direction from the fluid reservoir, then through the reservoir tubing, then through the first valve, then through the receiving channel, then through the second valve, then through the feed tubing, and then through the gastric tube.

24. The pacifier pump system of claim 22, wherein the first valve and the second valve are unidirectional valves.

25. The pacifier pump system of claim 21, wherein the housing is coupled to the pacifier by a fluid-tight fit between an outer surface of the housing and a surface that surrounds the opening to the nipple cavity.

* * * * *